United States Patent [19]

Zucker

[11] Patent Number: 4,904,923

[45] Date of Patent: Feb. 27, 1990

[54] CURRENT AMPLIFYING DEVICE

[75] Inventor: Oved S. F. Zucker, Del Mar, Calif.

[73] Assignee: Energy Compression Research Corp., Del Mar, Calif.

[21] Appl. No.: 233,542

[22] Filed: Aug. 12, 1988

Related U.S. Application Data

[63] Continuation of Ser. No. 578,172, Feb. 8, 1984, abandoned, which is a continuation-in-part of Ser. No. 319,065, Nov. 6, 1981, Pat. No. 4,431,960.

[51] Int. Cl.[4] .................... G05B 24/02

[52] U.S. Cl. .................... 323/340

[58] Field of Search .................... 323/340, 342, 343, 355, 323/358, 359, 360

[56] References Cited

U.S. PATENT DOCUMENTS 4,431,960 2/1984 Zucker .................... 323/340

OTHER PUBLICATIONS

Charactéristiques des Transferts Inductifs a Haut Rendement par Proce,acu/e/ de Dissipatif, by M. Lengentil et C. Rioux, Revue de Physique Appliquée, Mar. 1976.

Théorie Simplifiée des Procédés de Transfert Inductif a Haut Rendement, by C. Rioux, Revue de Physique Appliquée, Mar. 1975.

*Primary Examiner*—Patrick R. Salce
*Assistant Examiner*—Anita M. Ault
*Attorney, Agent, or Firm*—Marks Murase & White

[57] ABSTRACT

Disclosed is a reversible inductive energy transfer device for use where efficient transfer of energy between inductors is required. The apparatus is a current amplifying device which utilizes an energy storage inductor which comprises a plurality of series connected induction elements, the inductor being connected in series with a current source and a load inductor. The series connected induction elements are progressively disconnected from the load inductor in a make-before-break manner. The switching may be accomplished by a mechanical switch or by means of superconducting switches, semiconductor switches or PCT switches. The energy storage inductor comprises a single turn or current loop having a plurality of high conductivity, at least partially mutually coupled current paths. The current is continuously or discretely diverted into progressively smaller current paths in order to amplify the current and transfer energy into the load inductor.

49 Claims, 16 Drawing Sheets

CURRENT AMPLIFYING DEVICE

This application is a continuation of application Ser. No. 578,172 filed Feb. 8, 1984, abandoned, which is a continuation-in-part of application Ser. No. 319,065 filed Nov. 6, 1981, U.S. Pat. No. 4,431,960.

BACKGROUND OF THE INVENTION

1. Field of the Invention

This invention relates generally to a device for the adiabatic energy transfer from an inductive store to an inductive and/or resistive load with or without power amplification.

The invention also provides a method and means for current and power multiplication for electromagnetic guns, high power pulse generators, and inertial fusion.

2. Prior Art of the Invention

The need for supplying large amounts of reversible inductive energy has prompted extensive work. The problem with direct transfer of inductive energy is twofold: (1) it is theoretically limited to 25% transferred with 50% overall efficiency, (2) the transfer process is obtained by opening a switch which invariably generates large transient voltages which makes the switching operation very difficult.

Conventional prior art related to high power multiplication for pulsed power applications such as high power pulse generators for inertial fusion, radiation sources, electromagnetic guns, and the like involve the resonant energy transfer between inductors and conventional or inertial capacitors. Such transfer is efficient, but has problems. The inertial capacitor is compact but slow in contrast to the conventional capacitor which is fast but large.

Prior art energy transfer between inductors concentrated mainly on transferring the energy via a capacitive or inertial (flywheel) "bucket" of variable size. Typically, a "bucket" containing about 5% of the total energy to be transferred had to be "carried" between the two reservoirs 20 times. (Such systems must still have all the opening switches needed to effect transfer.) For some applications inductive energies in the GJ range are required and consequently the "bucket" size is in the tens of MJ. The cost of such large capacitive or inertial systems is high.

Prior art related to power multiplication utilizing inductors only are of two types: (1) In the first type, a number of inductors are energized in series and reconnected to discharge in parallel. All the opening switches affecting the series to parallel conversions also see the extremely destructive high voltage when the resulting parallel arrangement is open circuited to energize the load; a fact that makes this circuit impractical. (2) In the second type, successive transfer of energy between inductors, with the attendant inefficiency, is affected by opening a switch with or without the aid of a transformer which is used for both impedance transformation and/or decoupling.

SUMMARY OF THE INVENTION

It is, therefore, an object of the present invention to provide a purely inductive high efficiency means for transferring energy between inductors, with substantially reduced voltage transients.

It is a further object of the present invention to provide a current amplifying device in which low voltage, low current energies are multiplied into a high current, high voltage energy pulse in the tera-watt range.

It is still a further object of the present invention to provide a pulsed current amplifying apparatus utilizing an inductive energy storage device.

It is yet another object of the present invention to provide a pulsed current amplifying apparatus in which a high energy pulse of current is achieved through mechanical switching of the energy from an inductance.

It is still a further object of the present invention to provide a high energy current amplifying apparatus in which a high energy pulse of current is achieved through electronic switching of the energy from the inductance.

It is a still further object of the invention to provide a method and apparatus for reversibly transferring energy between inductors in applications where high efficiency is required.

It is a still further object of the present invention to perform energy transfer and current multiplication by the use of single turn inductors.

It is a still further object of the present invention to perform energy transfer and current multiplication by use of configurations where induction and switching elements are concurrent.

It is a further object of the present invention to perform required switching process affecting energy transfer and current multiplication by manipulating the conductivity of a medium as a function of the spatial position in the medium.

It is also an object of the present invention to perform conductivity manipulation in space by the use of superconductivity, semiconductivity, or temperature dependent conductivity.

The apparatus of the present invention avoids many of the prior art problems.

In accordance with the present invention, there is provided an energy transfer current amplifying device which comprises a single turn inductor having a plurality of mutually coupled inductor elements. The single turn inductor serves as an energy storage device An energy source is switchably connected to the single turn inductor for supplying an energizing current to it. A load inductor, which may be integral with or separate from and connected to the energy storage inductor is operable to receive the current flowing through the single turn inductor. Means are provided which are operable to effectively "connect" the single turn energy storage inductor to the load inductor in order to form a first current carrying circuit between the energy storage inductor and the load inductor and to thereafter progressively disconnect at least some of the inductor elements of the energy storage inductor from the circuit. In this manner, the magnitude of the current in the circuit is increased.

The single turn energy storage inductor may be divided into individual inductor elements or elemental inductances by a series of generally parallel, closely spaced cords of a circle, the switching means being preferably coincident in space with the cords. This effectively increases both the number of switching "steps" and the mutual inductance between elemental inductances As will be understood by the artisan, as the number of steps increases the efficiency of the energy transfer also increases.

Alternatively, the single turn inductor may comprise a plurality of closely spaced, mutually coupled current path segments formed in the energy storage inductor wherein each adjacent current path segment defines a current loop through the load inductor having progressively decreasing inductance, preferably by progressively decreasing the length of the current path.

In a further embodiment of the invention, the single turn inductor may comprise a conducting sheet having mutually coupled conducting paths defined in the sheet by the switching means. The conducting paths define current loops through the single turn energy storage inductor and through the integral or separate load inductor, those current loops defining an energy storage inductor having a progressively smaller inductance.

In a further embodiment of the invention, the single turn inductor comprises an elongated central conductor and a coaxial outer conductor and the load inductor comprises a disk disposed in an annular space between the central and annular conductors. In this embodiment, the switching means comprises a helical winding having a plurality of mutually coupled turns operable to be selectively and progressively rendered electrically conducting. The helix is disposed in the annular space and is operable to form a closed current loop with the central and coaxial conductors in the load inductor disk. The closed current loop as defined by the above elements has a progressively decreasing current carrying length in accordance with the position of the conductive turn of the helical winding.

In a further advantageous embodiment of the invention, the single turn inductor comprises a helix which approximates a plurality of concentrically stacked, mutually coupled, generally cylindrically-shaped elements of progressively decreasing size which respectively define a plurality of current paths of progressively decreasing length. In this embodiment, "switching" is accomplished by sequentially controlling the conductivity of the cylindrically-shaped elements of the helix.

Advantageously, a second single turn inductor having a plurality of mutually coupled conductor elements may also be connected to the load inductor.

The present invention is also directed to a process for amplifying the current which comprises the steps of providing electrical energy to a single turn energy storage inductor which comprises a plurality of closely coupled conductor elements and then connecting the energy storage inductor in a single current loop circuit with a load inductor. The energy from the single turn storage inductor is then progressively transferred to the load inductor by progressively and sequentially disconnecting mutually coupled elements of the storage inductor from the single current loop circuit.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings.

DESCRIPTION OF THE PREFERRED EMBODIMENTS

The approach of the present invention is to transfer energy from one inductor to a second inductor by progressively changing the number of mutually coupled induction elements of either of the inductors in incremental amounts. Put more generically, the present invention transfers energy between inductors by incrementally changing the inductance of either inductor, for example by the sequential use of a switching mechanism. A similar transfer may be effected by the sequential use of switches to change the turns ratio of a transformer connecting the two inductors. In the limit, the change in inductance is sufficiently smooth to effect a theoretically 100% efficient transfer. While the general description of the principle given below involves lumped inductances and switches, it should be understood that the same principle applies equally well to distributed circuit elements, such as those illustrated in FIGS. 12–16 and described below.

Figure 1A:
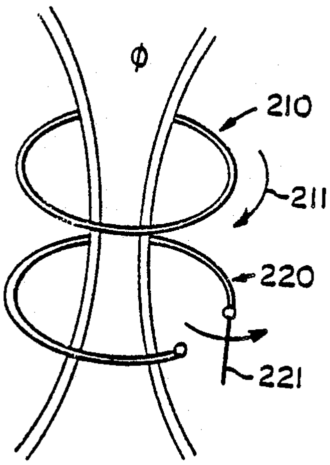
FIG. 1A is a perspective view of an apparatus for describing the principals of the invention.
Figure 1B:
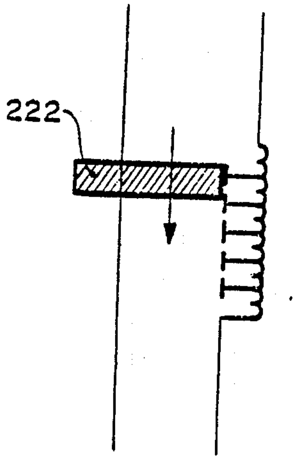
FIG. 1B and 1C are schematic circuit diagrams of multiturn arrangements in accordance with the principles of the invention.
Figure 1C:
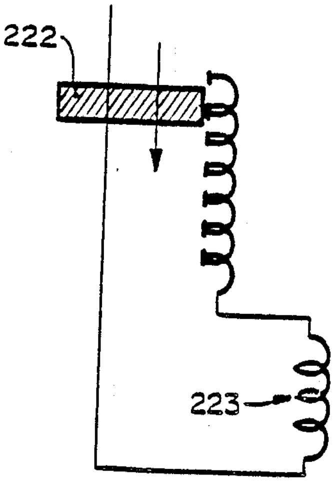

FIGS. 1A–1C explain the energy transfer principle. In FIG. 1A turn 220 and turn 210 are mutually coupled loops with perfect coupling surrounding a constant magnetic flux each carrying the same current value. If switch 221 of turn 220 is opened, the current flowing in turn 210 will be doubled.

In equation form this can be represented by the following equation $$NI = \frac{\phi}{\mu(A/l)}, \qquad (1)$$

where

A is the cross-sectional area enclosed by the coil winding, and:

l is the mean flux length,

N is the number of coil turns, and $\phi$ is the magnetic flux.

As long as the magnetic field geometry in space is constant, i.e. no work is done on or by the field, the amphere turns NI will remain constant, and reducing the number of turns increases the current. FIG. 1B shows such a multiturn arrangement where the change in the number of turns is affected by a sliding contact 222 as in a potentiometer in a manner to be described in detail below. Here we see that as the incremental change in the number of turns approaches zero, N decreases monotonically, while I increases monotonically according to the equation:

$$I = \frac{k}{N}, \qquad (2)$$

where $k=(\mu A/l)$. With the presence of a load inductor 223 (FIG. 1C), the above-mentioned monotonic current rise affects an energy transfer into this load. Now, however, the coupling is not perfect and the current rise obeys the equation:

$$I = \frac{\text{const}}{(N^2 + \alpha)^{1/2}} \qquad (3)$$

where $\alpha$ is the ratio of the load inductance to the geometrical source inductance $\mu A/l$. Alternatively, using lumped parameters (inductances), equation (3) may be rewritten as follows:

$$I = Io\left(\frac{Lo + L3}{L + L3}\right)^{1/2} \qquad (4)$$

where Lo, Io and L3 are the initial source inductance (see FIG. 2), initial current, and load inductance respectively. The inductance L is the instantaneous source inductance and is analogous to the instantaneous number of turns in equation (3) above.

From the above we see that this process is reversible in the sense that increasing the number of turns (or inductance) will reverse the direction of energy flow.

The above description refers to an idealized perfect coupling configuration. However, equation (4) is true in general so long as a minimum mutual coupling exists between inductive elements and the inductive elements approach zero.

The voltage generated at the load equals the load inductance times the rate of change of the current which can be kept quite low by a monotonic change in L affected, for example, by the use of many turns and taps. In the embodiment of FIG. 1C, the voltage at the sliding contact 222 has two components. The first is a fraction of the load voltage determined by the ratio of the number of turns or fraction of a turn per turn element to the remaining turns. This is generally a very small number The second component is due to imperfect coupling and equal to the rate of destruction of leakage flux, that is, flux associated only with the turn element which is presently switched out. This component is also low and is controlled in the example of FIG. 1C by a suitable tap or contact resistance.

Figure 2:
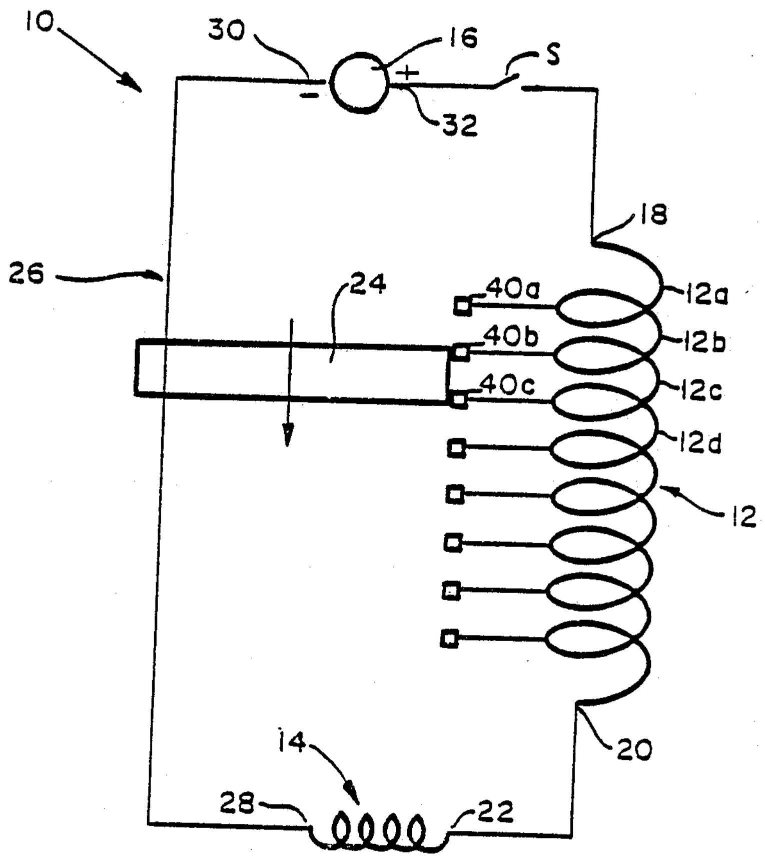
FIG. 2 is a schematic circuit diagram showing the mechanical configuration of the current amplifying apparatus of the present invention.

The turn wiping action affected by the slide contact is shown in detail in the embodiment of FIG. 2.

With reference to FIG. 2, there is illustrated a schematic diagram of the basic configuration of the current amplifying apparatus 10 of the present invention.

Current amplifier 10 comprises, basically, an energy storage inductor 12 connected in series to a load inductor 14 (which may or may not be inductively coupled to energy storage inductor 12) and a current source 16 which includes an on/off switch S for disconnecting the source 16 from the circuit after energizing the storage inductor 12 and a switching arrangement to effect energy transfer.

In FIG. 2, although load 14 is shown as a pure inductance, other loads comprising pure resistance, or capacitance, or combinations thereof, can be used. Moreover, the load inductor 14 can be integrally formed with the energy storage inductor, for example by forming the end portion thereof or can be a separate load as indicated in the drawing.

The energy storage inductor 12 comprises a plurality of series connected induction elements 12*a*, 12*b*, 12*c*, etc., beginning at first end of storage inductor 12 electrically distant from the load inductor 14 and ending at second end 20 of the load inductor 14. A shorting bar 24 is adapted to electrically connect individual induction elements 12*a*, 12*b*, 12*c*, etc., to conductor 26 which electrically connects second side 28 of load 14 to second side 30 of current source 16 by means of terminals 40*a*, 40*b*, 40*c*, etc. A first end 18 of induction coil 12 is, as shown, connected to first side 32 of current source 16.

Figure 6A:
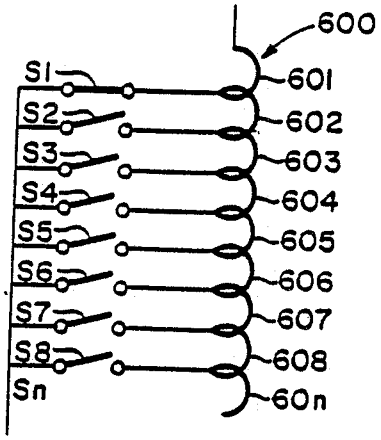
FIGS. 6A, 6B and 6C, are schematic electrical diagrams illustrating the switching action of the apparatus of FIGS. 2, 4 or 5.

A general description of the process involving only lumped inductances and switches and will be explained with the aid of FIGS. 2 and 6. Initially, current is established in the circuit comprised of the entirety of the energy storage inductor 12 and load inductor 14. The induction elements 12*a*, 12*b*, . . . of the storage inductor 12 are then switched out of the circuit in a manner similar to the sequence illustrated in FIGS. 6*a*, 6*b* and 6*c*. From FIGS. 6*a*, 6*b* and 6*c*, it is noticed that closing of switch S1 provides a current path after an initial current is established in the circuit (FIG. 6*a*). Subsequently switch 52 is closed (FIG. 6*b*) and switch S1 is opened (FIG. 6*c*), thus removing the incremental inductance 602 from the circuit This corresponds to the shorting bar 24 in FIG. 2 contacting and breaking contact with terminals 40*b* and 40*a*, respectively, thus removing inductive element 12*b* from the circuit. This process is continued through sequential switching in the above fashion, until the desired current levels and transferred energy are achieved in the load inductor 14. Thus, referring to FIG. 2 and defining the load inductor 14 as $L_3$, the inductance between terminal 40c and 20 as $L_2$, and the inductance element 12c as $L_1$, and recognizing a mutual inductance M between $L_1$ and $L_2$, where $M=k\sqrt{L_1 L_2}$, one can write an equation for the incremental current rise ΔI obtained when bar 24 disconnects itself from contact 40c as follows:

$$\Delta I/I=-M/(L_2=L_3) \quad (5)$$

Likewise, the incremental change in the total circuit inductance is given as:

$$\Delta L/(L_2+L_3)=(L_1+2M)/(L_2+L_3)= \quad (6)$$

$$L_1/(L_2+L_3)+2k\sqrt{L_1/(L_2+L_3)}$$

$$\text{or } \Delta L/L=L_1/L+2k\sqrt{L_1/L} \quad (6')$$

$$\text{or } \Delta L/L=L_1/L+2M/L \quad (6'')$$

where L is the instantaneous circuit inductance ($L_2=L_3$).

In other words, if $k>>\sqrt{L_1/L}$, then the second term of equation (6') or (6") dominates and the following approximations are valid $$\Delta L/L \doteq 2k\sqrt{L_1/L} \text{ or} \quad (7)$$

$$\Delta L/L \doteq 2M/L \quad (7')$$

This is known as the coupling criteria and can be met as long as some mutual coupling, however small exists between $L_1$ and L. Since the incremental change in circuit energy ΔW/W may be expressed as:

$$\Delta W/W=(2\Delta I)/I+\Delta L/L \quad (8)$$

where $W=(1/2)LI^2$, it is easily seen that upon substitution of equations 5 and 6"into equation 8, the energy change produced by the sliding action approaches zero as the coupling condition is met.

The efficiency of the transfer of energy forward in the circuit also manifests itself in reducing the energy losses in the process. Such losses occur in the switches and, thus, as the losses become small, the voltage occurring across the switches goes down, making the switching process easier. Until the emergence of the present invention, switch problems including both switch feasibility and lifetime, have severely limited the usefulness of inductive energy storage and transfer. With the present invention, as the number of switching steps increase, then the voltage across the switches monotonically drops toward zero for any nonzero coupling coefficient, k.

In the limit the process is thermodynamically reversible allowing for efficient direct energy transfer between inductors where the switching action producing energy transfer experiences energy dissipation and voltages approaching zero.

With reference to FIGS. 3A through 3F, inclusive, there are illustrated several turns of an energy storage induction coil 12 and various stages of the progressive wiping action by shorting bar 24 as it travels from first end 18 to second end 20 of induction coil 12.

Figure 3A:
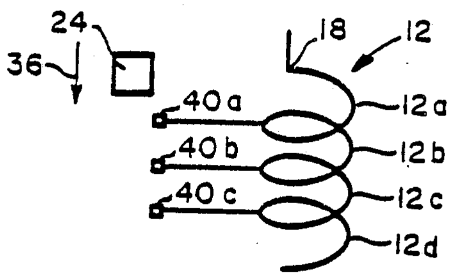
FIGS. 3A, 3B, 3C, 3D, 3E and 3F are schematic electrical diagrams illustrating the turn-wiping action of the apparatus shown in FIG. 2.

With particular reference to FIG. 3A, shorting bar 24 is shown immediately prior to beginning the wiping action Shorting bar 24 will begin travel in the downward direction shown by arrow 36.

Figure 3B:
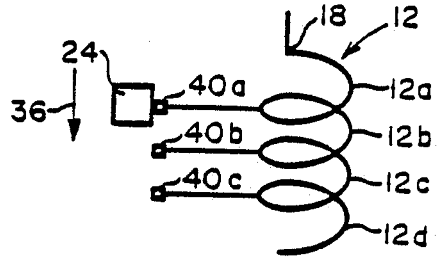
Figure 3C:
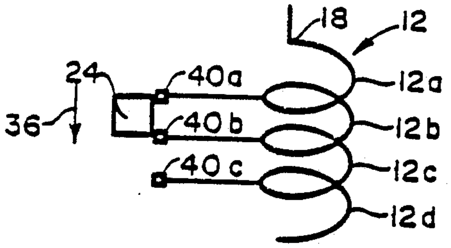

With reference to FIG. 3B, shorting bar 24 is shown making contact with terminal 40a of induction element 12a. As shorting bar 24 continues in the direction of arrow 36, and as shown in FIG. 3C, it next contacts terminal 40b which connects induction element 12b to side 28 of load inductor 14, and also to immediately adjacent induction element 12a since the width of shorting bar 24 is adapted to bridge or make contact with both terminals 40a and 40b simultaneously.

Figure 3D:
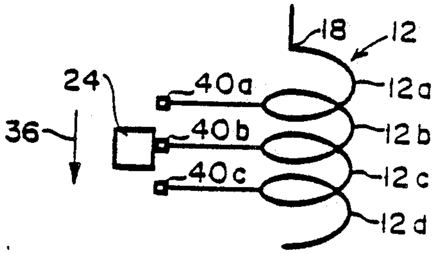

As shorting bar 24 continues its travel in the direction of arrow 36, in FIG. 3D, shorting bar 24 is shown in sole contact with terminal induction element 12b and is disconnected from terminal 40a of induction element 12a.

Figure 3E:
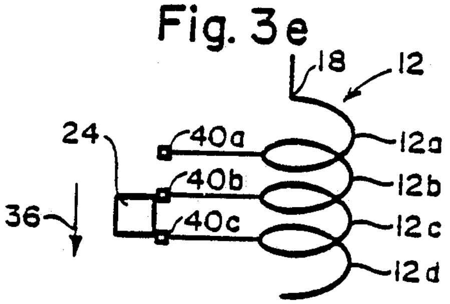

With reference to FIG. 3E, as shorting bar 24 continues its travel in the direction indicated by arrow 36, it comes in contact with terminal 40c of induction element 12c, while concurrently being in contact with terminal 40b of induction element 12b as well as with side 28 of load inductor 14.

Figure 3F:
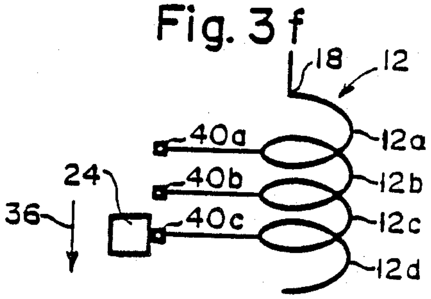

Still continuing in the direction indicated by arrow 36, as shown in FIG. 3F, shorting bar 24 comes in sole contact with terminal 40c of induction element 12c and becomes disconnected from terminal 40b of induction element 40b. Thus the wiping action is performed in the manner of a make-before-break switch which alternately connects a single induction element to side 28 of load inductor 14 and then shorts out adjacent induction elements while still being connected to side 28 of load inductor 14, followed by connecting a single adjacent induction element to the end 28 of load inductor 14 as the shorting bar 28 travels along induction coil 12 toward load inductor 14. Therefore, as the number of turns is reduced, as by the wiping action of shorting bar 24 traveling from first end 18 to second end 20 of induction coil 12, the current is increased such that the last turn of coil 12 will carry a current equal to the number of turns of coil 12 times the initial current through the coil.

Basically, the process for amplifying a current utilizing, for example, current amplifying apparatus 10 comprises the steps of causing an electrical current to flow in a series connected load inductor 14 and energy storage induction coil 12, the induction coil 12 comprising a plurality of serially connected induction elements 12a, 12b, 12c, etc., and then progressively electrically connecting the individual induction elements 12a, 12b, 12c, etc., to a side 28 of load inductor 14 electrically distal from the induction coil 12 beginning at first end 18 of induction coil 12 electrically distal from the load inductor 14 and ending at second end 20 of the induction coil 12, electrically nearest the load inductor 14. It will be appreciated by the artisan that the method described above is exemplary only and is used for illustrative purposes and does not limit the invention to the specific steps thereof.

Figure 4:
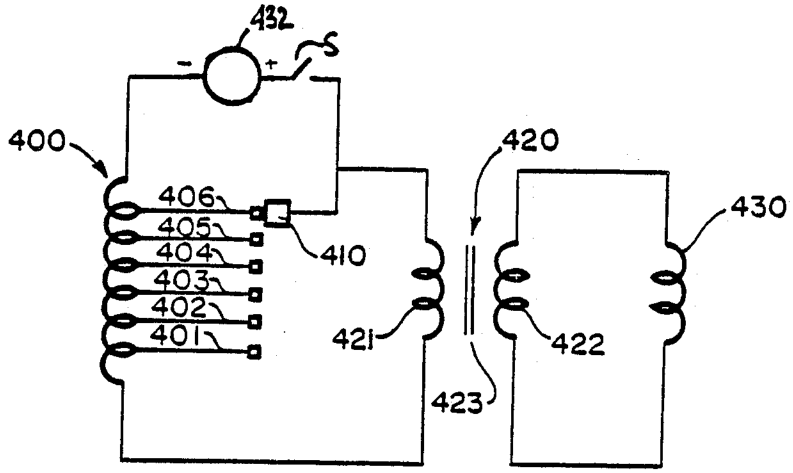
FIG. 4 is a schematic circuit diagram showing another configuration of the current amplifying apparatus of the present invention.
Figure 5:
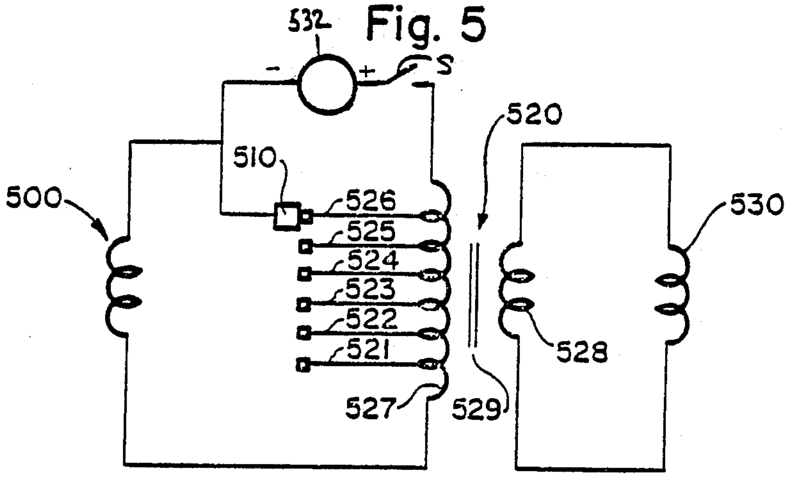
FIG. 5 is a schematic circuit diagram showing another configuration of the current amplifying apparatus of the present invention.

FIGS. 4 and 5 represent two additional embodiments of the invention. In FIG. 4, 400 represents the storage inductor and 401–406 represent taps along the storage inductor 400. Switch 410 represents a sliding contact similar to switch 24 in FIG. 2. Transformer 420, which couples the current to a load inductor 430, consists of primary winding 421, secondary winding 422 and core 423. The energy storage 432 has an ON/OFF switch S for switchably connecting the source 432 in the circuit to energize the storage inductor 400.

In FIG. 5, the storage inductor 500 is untapped. The taps 521–526 are disposed on a primary winding 527 of the transformer 520, which also has a secondary winding 528 and a core 529. The load inductor 530 is placed across the transformer secondary 528, and a sliding contact 510 is positioned along the taps. An energy source 532 having an ON/OFF switch S is provided for initially charging the storage inductor 500.

The operation of the circuit of FIGS. 4 and 5 is similar to that of FIG. 2. The storage inductors, 400 and 500, and transformer 520, respectively, are composed of closely coupled turns or inductor elements In FIG. 4 the induction elements have taps connected to them, in FIG. 5 the taps are connected along the transformer primary winding 527. Sliding the contact 410 or 510, respectively, along the taps has the effect of changing the inductance of the storage inductor 400 or the turns ratio of the transformer 520.

The changing of the tap positions in the circuits of FIGS. 2, 4 or 5 effectively constitutes a switching action. The sliding contacts in FIGS. 2, 4 or 5, i.e., members 24, 410 and 510, respectively, may therefore be in the form of switches that open and close as shown in FIGS. 6A–C. The voltages seen by the switches $S_1$, $S_2$, . . . $S_n$ in FIGS. 6A–C is kept below the load voltage, i.e. the voltage across load inductor 14 in FIG. 2 or load inductor 430 in FIG. 4 or load inductor 530 in FIG. 5 since the switch voltage is always transformed down by the ratio between the inductor elements opened and the remaining inductor element in the storage inductor (or primary winding of FIG. 5). Thus, if in the case of the direct-coupled embodiment of FIG. 2 which requires high voltage, high current switches, it is advantageous to use superconducting switches. In the transformer coupled embodiment of FIGS. 4 and 5, the source current is different from the load currents. Therefore, different switch impedances are used according to the load inductor to be energized.

Figure 6B:
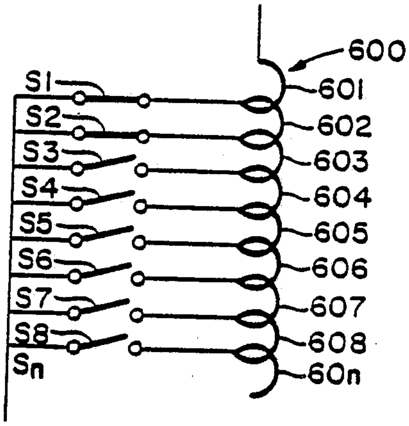
Figure 6C:
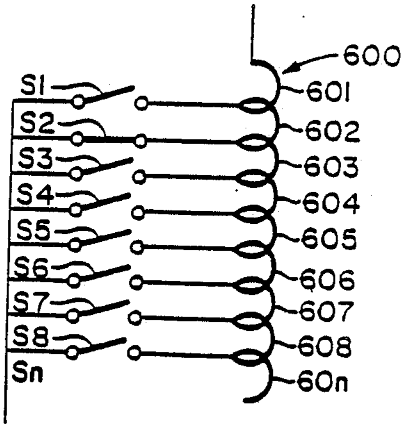

As can be readily seen from FIGS. 6A–6C, the switch embodiment of the present invention utilizes the same make-before-break contact mode as did the sliding tap embodiment of FIGS. 3A to 3F. Thus, in FIG. *6a*, switch S1 is closed, shorting out element 601 of inductor 600 while all the remaining switches are open. Switch S2 then closes while S1 remains closed. Not until after S2 is switched, is S1 reopened. This sequence of operation is repeated for the remaining switches associated with the inductor 600.

It should also be understood that all of the switches $S_1$, $S_2$, $S_3$. . . $S_n$ can be simultaneously closed. after the energy storage inductor 600 is energized to establish multiple current paths between the elements of the energy storage inductor 600 and the load. In that case, the progressive switching action merely comprises the progressive, sequential opening of the switches $S_1$, $S_2$, $S_3$. . . $S_n$ in order to progressively remove inductor elements from the circuit.

It will be understood that the switch sequencing can be done mechanically, electromechanically or electronically and in that regard the switch may be either of the mechanical, electromechanical or semiconductor variety or exploding wire variety.

Figure 7:
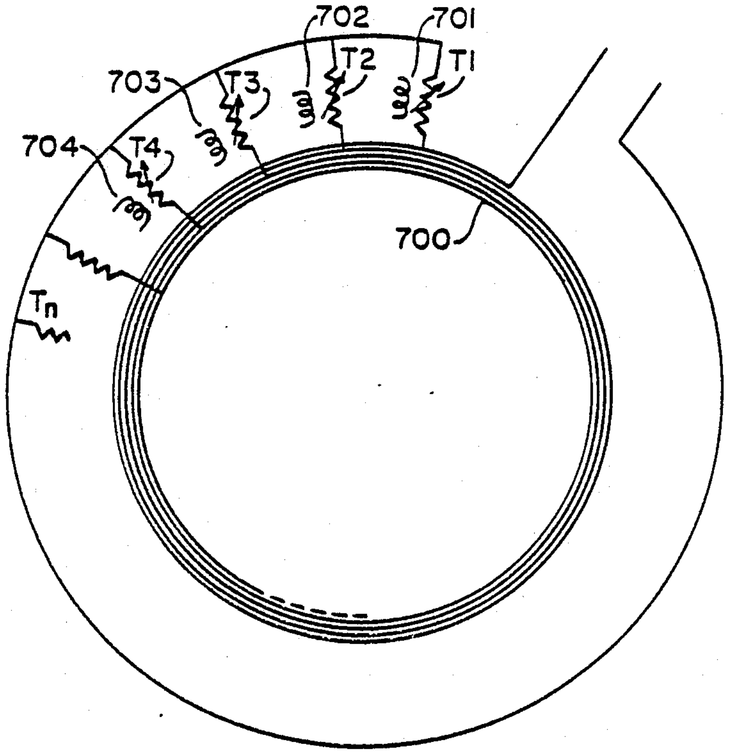
FIG. 7 is a schematic circuit diagram showing another configuration of the current amplifying apparatus of the present invention.

A superconducting storage and switching embodiment is depicted in FIG. 7. Here concentric taps $T_1$–$T_n$ are positioned in an arrangement about a circular inductor 700. The taps are represented in FIG. 7 by variable resistors $T_1$, $T_2$, . . . $T_n$ which may be superconducting or electromechanical switches. It will be understood that the resistors can be field or heat activated by, for example coil elements, e.g. 701 and 702, which can be heating coils or EM coils. The operation of these coils forms no part of the instant invention but can be accomplished according to the teaching of H. L. Laquer in the article entitled *Superconductivity, Energy Storage and Switching,* p. 279 et seq in Energy Storage, Compression and Switching (Plenum Press, New York, 1976).

Likewise, the switches, e.g. $T_1$, $T_2$ can be semiconducting. The manner of switching forms no part of the instant invention but can be accomplished according to the teachings of Peterson et al in their article entitled *Superconductive Inductor-Converter Units for Pulsed Power Loads* appearing at p. 309 et seq of Energy Storage, Compression and Switching (Plenum Press, New York, 1976).

Figure 8A:
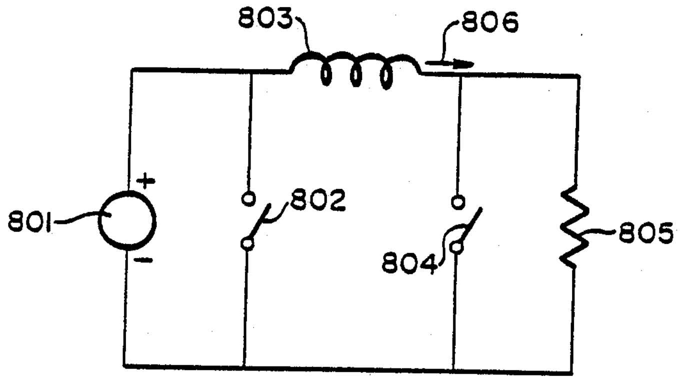
FIG. 8A is a schematic circuit diagram of a high power application of the invention.

For the purpose of multiplying power in the terra watt regime, an inductor carrying millions of amperes may be shunted by an opening switch such as an exploding wire array as detailed below, a reflex switch, or an imploding plasma such as a dense plasma focus. Typically, these serve as both load and switch as shown in FIG. 8A. With switch 802 of FIG. 8A open and switch 804 closed, energy source 801 can be switched on to energize inductor 803, thus building up a current in the inductor whereupon switch 802 is closed and the energy source 801 switched off. When switch 804 opens, the energy stored in inductor 803 is delivered to the load at great power.

Typically the current indicated by the arrow 806 is in the MA range and opening switch 804 can carry this current for short times only. This requires the energy source 801 to build up the current in inductor 803 very rapidly To date only capacitive storage was sufficiently fast for these applications.

Figure 8B:
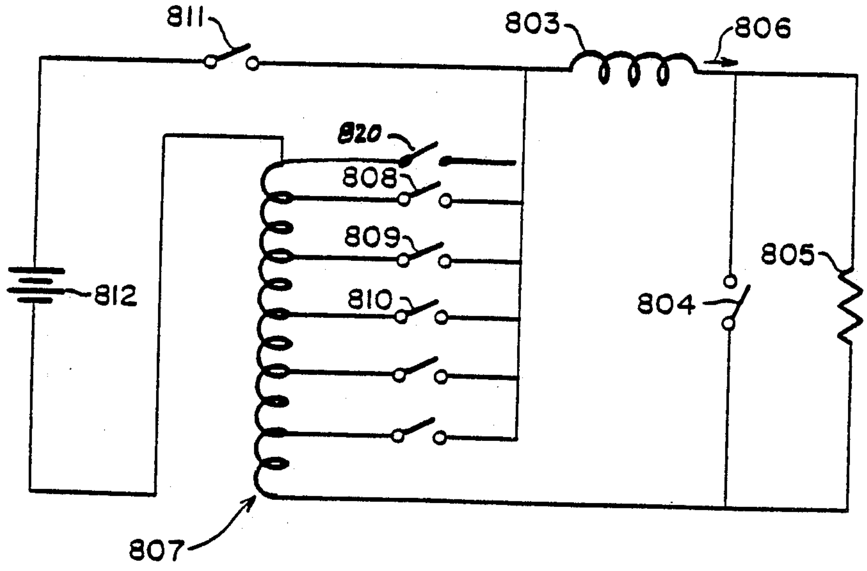
FIG. 8B is a schematic circuit diagram of a further embodiment of the invention.

An embodiment of the present invention where inductor 803 is energized by a switching action such as that described above and illustrated in FIGS. 2, 3, and 6 is shown schematically in FIG. 8B. Here a primary energy source 812 energizes storage inductor 807 via switch 811. Due to the fact that inductor 807 is chosen to be much greater than inductor 803, the current during this phase is very small and does not affect switch 804 adversely. Also, under these conditions most of the energy transferred from source 812 resides in storage inductor 807.

For energy transfer from storage inductor 807 to inductor 803, switch 820 is closed while switch 811 is opened to first isolate source 812. Then, in a manner similar to the method described previously, switch 808 is closed followed by opening switch 820. Switch 809 is then closed followed by the opening of switch 808 and so forth until all the switches in storage inductor 807 have been opened. As before, the current multiplier transfers the energy to load inductor 803 by opening switch 804 when current 806 has reached a maximum to energize load 805 at very high power.

Alternatively, as indicated above with respect to FIG. 6, the switching sequence can also be performed by first closing the switches 820, 808, 809, etc. and then opening them sequentially.

Figure 9A:
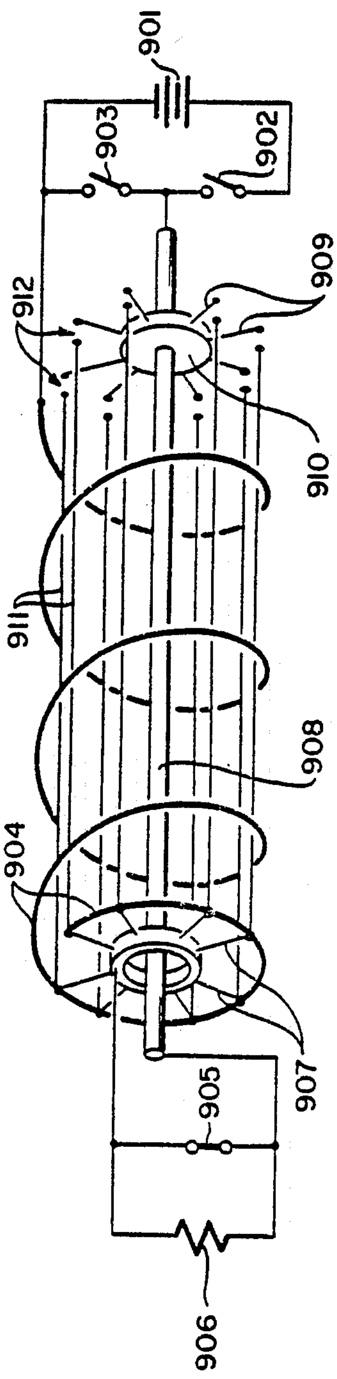
FIGS. 9A–9F illustrate a further embodiment of the apparatus of the present invention utilizing a helical induction coil and squirrel cage configuration and the operation thereof.
Figure 9B:
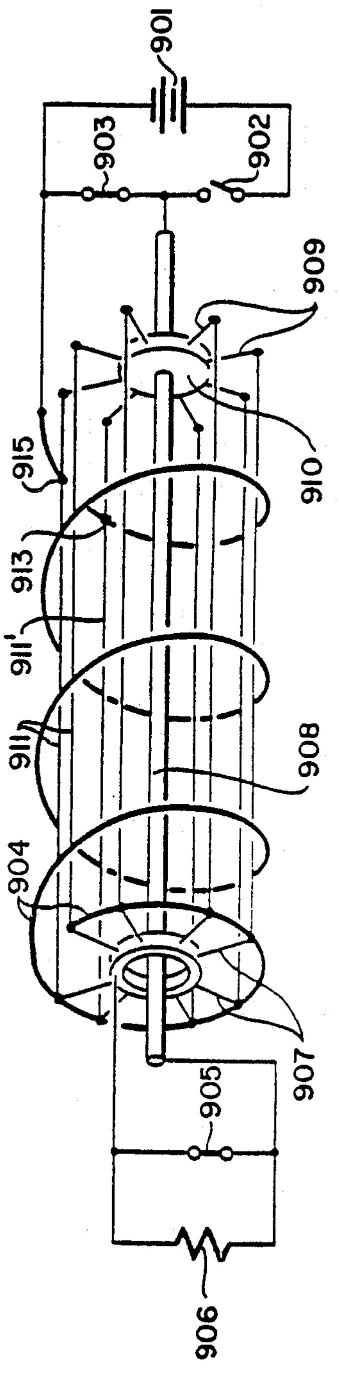

An embodiment of this circuit, where the load inductor 803 is spatially concurrent with storage inductor 807 while magnetically decoupled is shown in FIG. 9A.

Here storage inductor 807 of FIG. 8B is represented by the helix winding 904. It produces a magnetic field axial with respect to the helix. Inductor 803 of FIG. 8B is equivalent to center rod 908. Thus while the inductors 904 and 908 are concurrent in space, they are magnetically distinct.

The circuit operates as follows. Initially (FIG. 9A) all the energy in the circuit is stored in primary source 901 and all currents are zero. When switch 902 is closed, a current builds up in storage inductor 904 by flowing through rod 908, load switch 905, spokes 907, and helix 904, and back to source 901. Upon completion of energy transfer to the storage inductor 904, a relatively low current flows in the circuit. The source 901 is then isolated by closing switch 903 and opening switch 902. The spokes 907 are then shorted to rods 911 through shorting gaps 912 to provide a coaxial current path through the rods 911 as is explained in detail below.

Figure 9C:
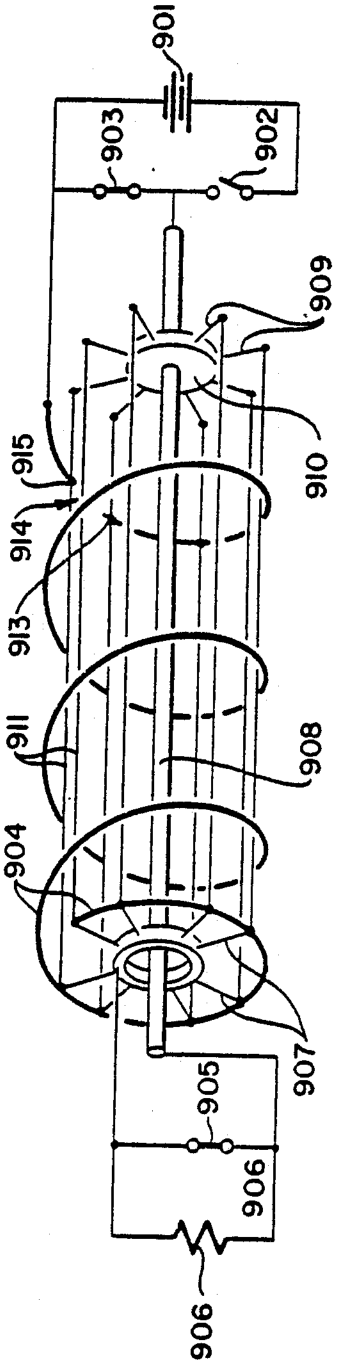
Figure 9D:
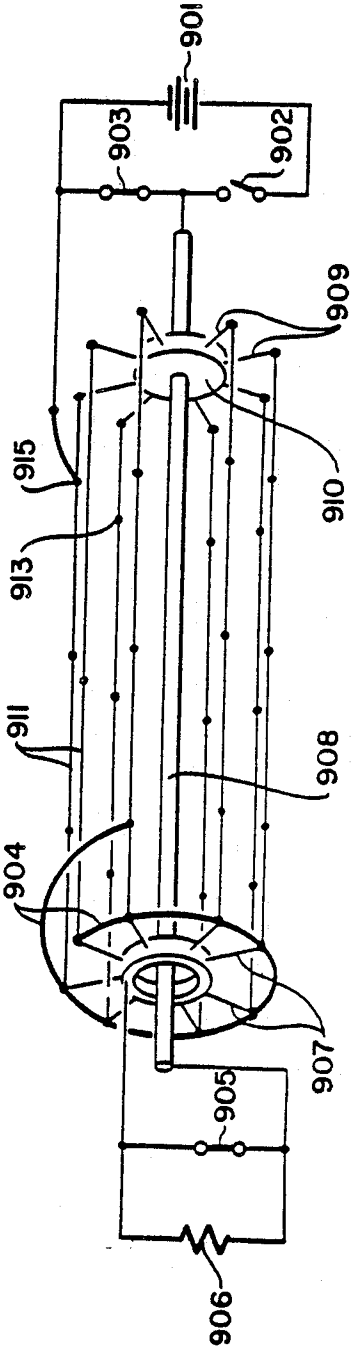
Figure 9E:
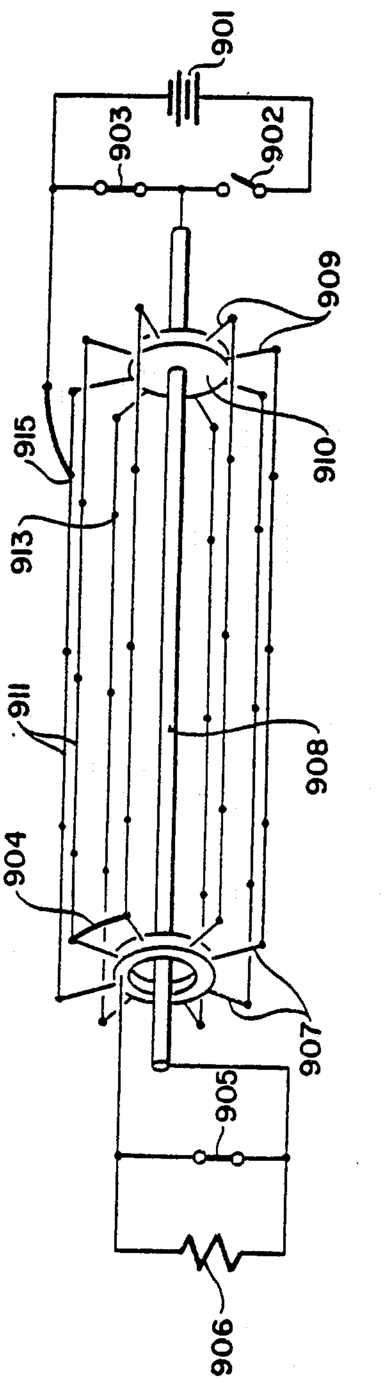

The switching action of switches 820, 808, 809 . . . in FIG. 8B is analogous to the "switching" of the helix 904 of FIG. 9A. The switching action of FIG. 9A is best understood by reference to FIGS. 9B through 9E and is affected by shorting the beginning of the helix 904 to a rod 911 at a point 915. The helix 904 if then shorted to the following rod 911' at point 913 followed by open circuiting the helix 904 at point 914 (FIG. 9C) between points 915 and 913. This process is sequentially and repeatedly followed in the same manner as described above as the helix 904 is alternatively shorted to members 911 and open circuited at the point electrically nearest to the source from the point on the helix that was shorted to the member 911. This process continues in a manner analogous to that described in reference to FIGS. 2, 3A–3F, and 6A–6C until all the helix is gone (or disconnected into small pieces) as illustrated in FIGS. 9D and 9E. The above-described switching action roughly multiplies the current by the number of turns in the helix, which practically would be between 10 and 100 times but as will be understood by the artisan could in theory be any number of turns, depending only upon the current multiplication desired and the physical constants of the materials involved.

Figure 9F:
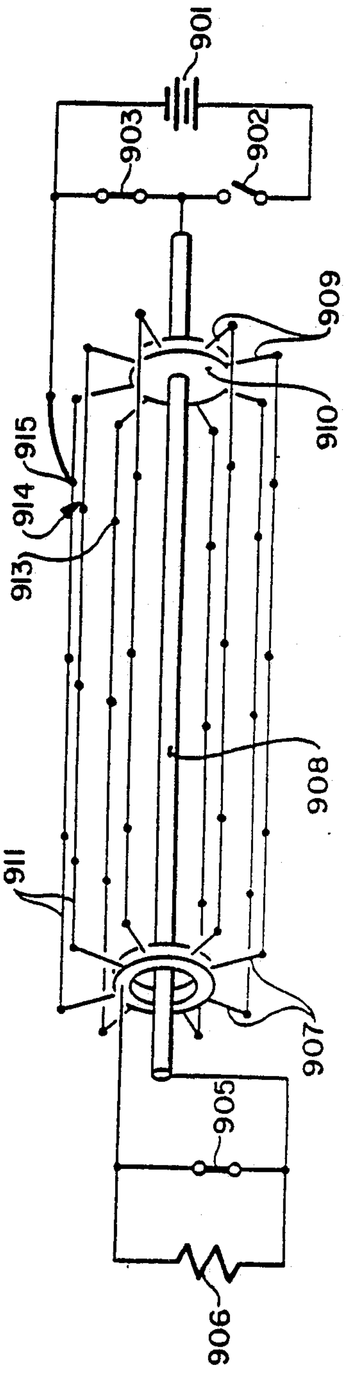

The resulting configuration (FIG. 9F) has all the current flowing axially in the center rod 908 and the circumferential rods 911. This is a very favorable configuration for discharging the energy into load 906 by opening switch 905. It should be noted that upon such a discharge, the high electric field generated is all radial between the central rod 908 and circumferential rods 911. The switching action described above has all been at the outer circumference of the device and the subsequent loss of the helix 904 will not interfere with the transfer of energy to load 906.

The switching sequence to effect the energy transfer from the helix configuration to the coaxial configuration can be very fast. The shorting action 915, 913, 914, etc. can be accomplished using electrically or optically triggered semiconductors or can operate by insulation breakdown with exploding wires. The opening "switch" action 914 at helix 904 can be either a superconductor as in FIG. 7 or the helix can be configured as an exploding wire where the successive increase in current causes the next section of helix to blow in a manner similar to a fuse and thus act as an open circuit. The art of opening a circuit by the use of blowing and non-blowing fuses is well known and does not per se form any part of the present invention.

Figure 10B:
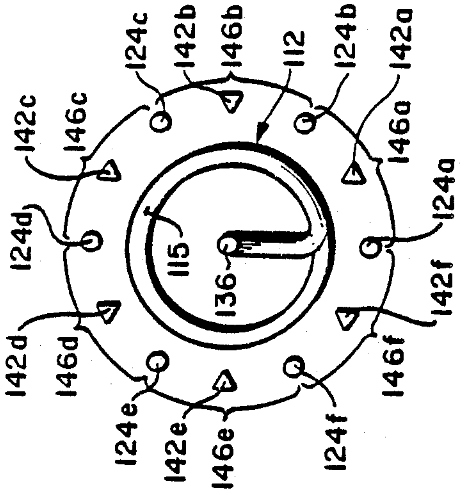
FIG. 10B is an end view of the apparatus of FIG. 10A.
Figure 10A:
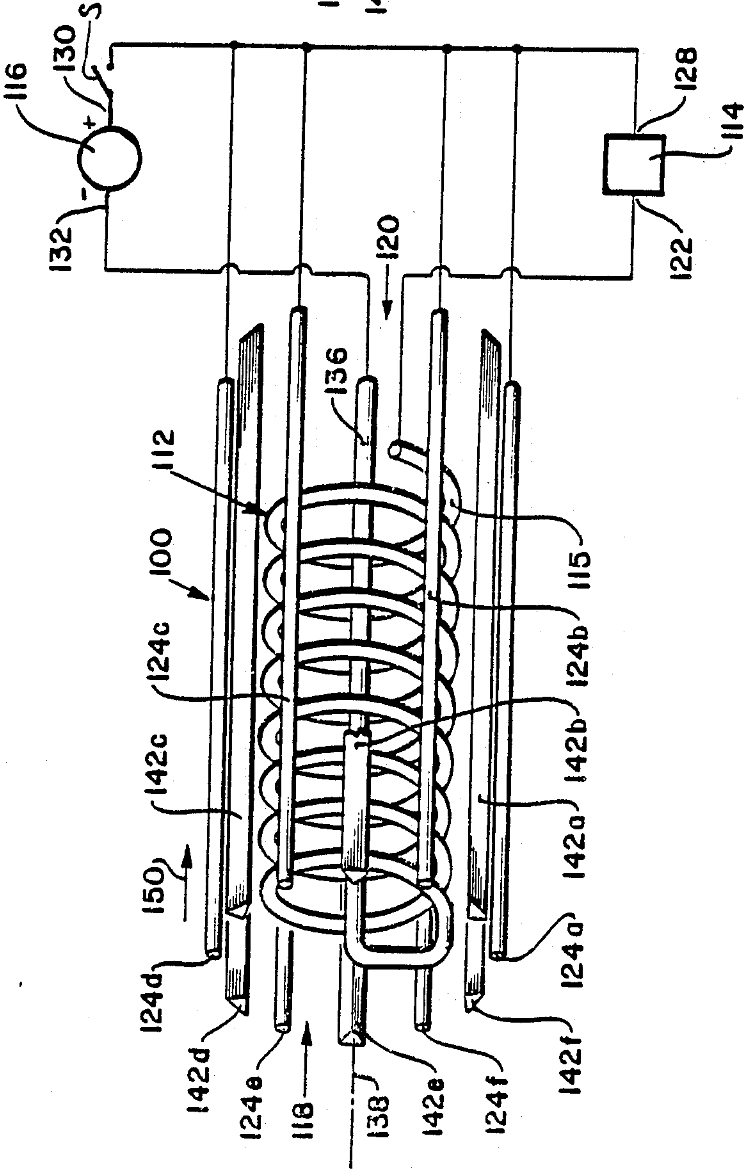

For slower energy transfer rates, i.e., between 100 = sec and 10 msec, the invention can alternatively utilize the propagating detonation of a fuse as illustrated in FIGS. 10A and 10B.

With reference to FIG. 10A, there is illustrated a squirrel cage current amplifying apparatus 100 in accordance with a preferred embodiment of the present invention. This embodiment basically comprises a helically wound coil conductor 115 defining an energy storage induction coil 112 which is connected, at one end 118, to a side 132 of current source 116 having an ON/OFF switch S and at another end 120 to a side 122 of load 114. The other side 128 of load 114 is, in turn, connected to a side 130 of the current source 116 via the switch S.

A plurality of shorting bars, **124*a* through 124*f*, inclusive, are equally spaced circumferentially about induction coil 112 to define a squirrel cage configuration. A first conductor 136 is positioned coaxially through the center of induction coil 112, and connects first end 118 of induction coil 112 to a side 132 of the current source 116**.

It will be noted that first conductor 136 is coincident with longitudinal axis 138 of induction coil 112. It is also apparent that shorting bars **124*a* through 124*f*, inclusive, are parallel to longitudinal axis 138**.

Also surrounding induction coil 112 and spaced equidistant between shorting bars **124*a* through 124*f*, inclusive, are conductor shear bars 142*a* through 142*f***, inclusive.

In addition, shorting bars **124*a* through 124*f* are also electrically connected to side 128 of load 114 and side 130 of current source 116. The electrical connection is made adjacent the end 120 of induction coil 112**.

With particular reference to FIG. 10B, there is illustrated an end view of squirrel cage current amplifying apparatus 100 of FIG. 10A. In FIG. 10A, it can be seen that, from this end view, shorting bars **124*a* through 124*f* are shown equally spaced circumferentially around induction coil 112**.

It should be noted that along helically wound coil conductor 115, between each shorting bar, is defined an individual induction element. That is, instead of an induction element being defined as a single loop of the induction coil, as in current amplifying apparatus 10 of FIG. 1, an induction element of squirrel cage current amplifier 100 is defined as a portion of a loop of induction coil 112.

For example, the induction element identified as induction element **146*a* is that portion of the coil conductor 115 loop disposed between shorting bars 124*a* and 124*b*. Induction element 146*b* is defined by that portion of the coil between shorting bars 124*b* and 124*c*. Induction element 146*c* is defined by that portion of the coil between shorting bars 124*c* and 124*d*. Induction 146*d* is defined by that portion of the coil between shorting bars 124*d* and 124*e*. Induction element 146*d* is defined by that portion of the coil between shorting bars 124*d* and 124*e*. Induction element 146*e* is defined by that portion of the coil between shorting bars 124*e* and 124*f*. Induction element 146*f* is defined by that portion of the coil between shorting bars 124*f* and 124*a***.

Figure 11A:
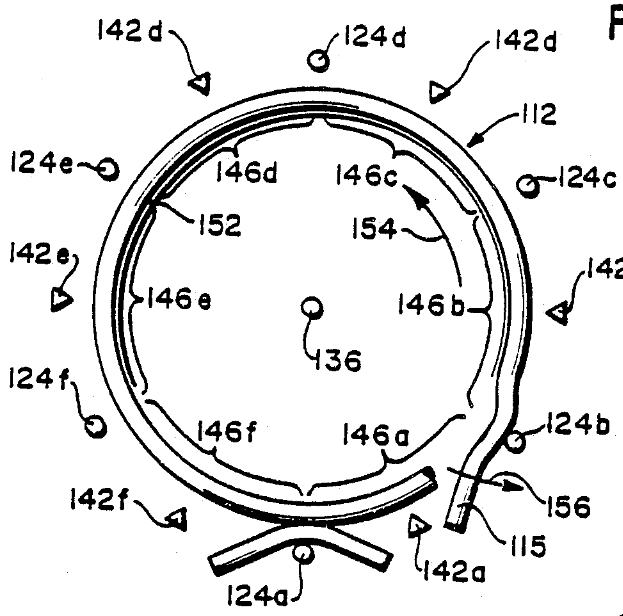
FIGS. 11A, 11B and 11C are cross-sectional views of the apparatus of FIG. 10A taken at line 10—10 showing progressive stages of wiping, smearing or connecting adjacent induction elements to the load inductor.
Figure 11B:
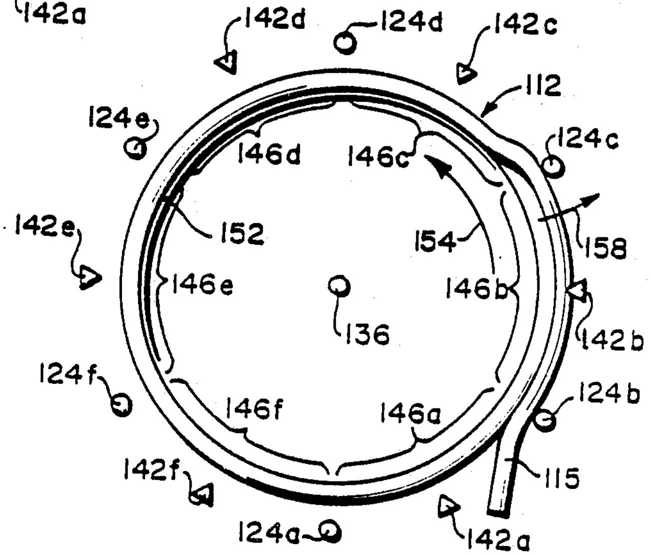
Figure 11C:
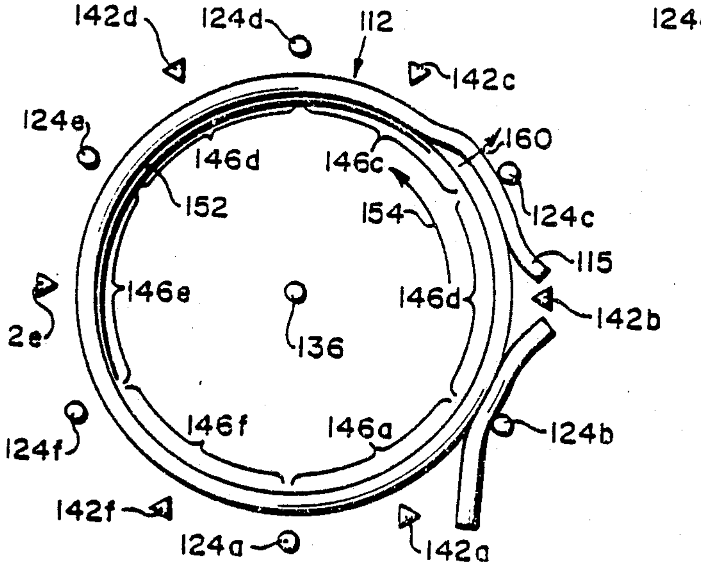

The operation of squirrel cage current amplifying apparatus 100 is best illustrated in FIGS. 11A, 11B and 11C which are cross-sectional views taken of squirrel cage current amplifying apparatus 100.

As shown in FIG. 11A, the combustion shock wave of detonating fuse 152 is shown propagated just beyond shorting bar **124*b* whereby the force of the shock wave has forced conductor 115 outwardly, as shown by arrow 156, to make electrical contact with shorting bar 124*b***.

In FIG. 11B, the combustion shock wave of detonating fuse 152 is now shown propagated to a point just beyond short bar 124c continuing to force coil conductor 115 outwardly, as indicated by arrow 158, to make electrical contact with immediately adjacent shorting bar 124c, while at the same time maintaining contact with shorting bar 124b. It will also be noted that coil conductor 115 is also initially making mechanical contact with conductor shearing bar 142b. Thus, induction element 146b is now effectively shorted out.

With reference to FIG. 11C, the combustion shock wave of detonating fuse 152 has not propagated to a point approaching shear bar 142c while still remaining in electrical contact with shorting bar 124c. At this point, it will be noted that coil conductor 115 has now been completely severed by shear bar 142b. Thus, induction element 146b is now disconnected from the circuit. This leaves shorting bar 124c connected to coil conductor 115.

In a like manner, the combustion shock wave of detonating fuse 152 will continue in the direction shown by arrow 160 to a position causing coil conductor 115 to make electrical contact with shorting bar 124d while concurrently maintaining electrical contact with shorting bar 124c, after which shear bar 142c will sever coil conductor 115 effectively disconnecting induction element 146c from the circuit.

Thus, in a manner similar to that described for current amplifying apparatus 10 of FIGS. 2 and 3E through 3F, a first induction element of the induction coil is connected to the load followed by connecting first and second immediately adjacent induction element to each other as well as to the load, followed by disconnecting the first induction element from the load, leaving the second induction element electrically connected to the load.

With respect to FIG. 10A and the squirrel cage amplifying apparatus 100, the current passing initially through conductor 115 of induction coil 12 will generate a large magnetic field component and a small electric field component due to the central return through first conductor 136. As previously described, removing turns, as illustrated in FIGS. 3A through 3F, inclusive, and FIGS. 6A through 6C, inclusive, will increase the current which will increase the circumferential magnetic field at the expense of the axial magnetic field When all turns are removed, there is left only a coaxial inductor which can be dumped into, that is, connected to, the load.

Figure 12:
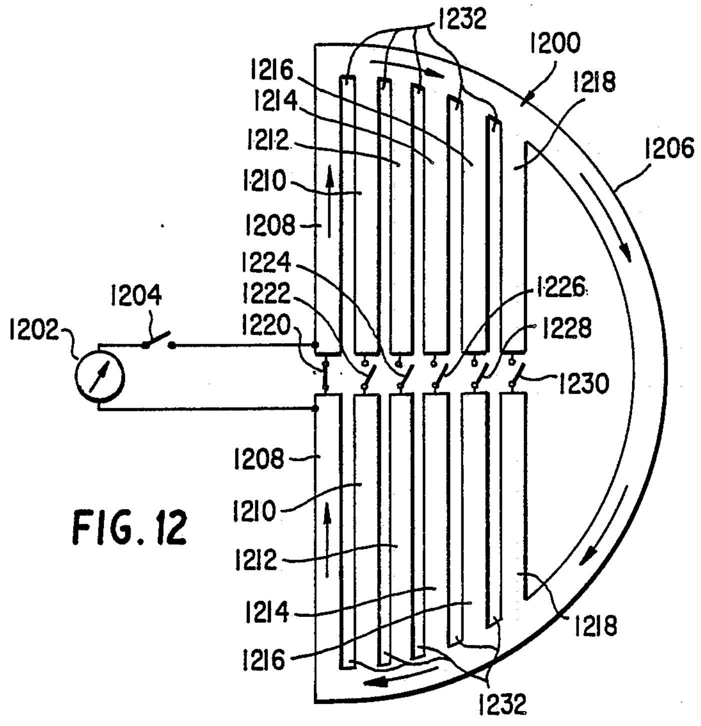
FIG. 12 is a schematic representation of a single turn embodiment of the present invention.

Turning now to FIGS. 12–16 there are depicted various embodiments of what may be termed a single loop or single turn embodiment of a energy transfer and current multiplier device according to the invention. As will be developed in detail below, the single loop embodiments are particularly applicable to those applications where very fast switching times are required. Although the current "loops" in FIG. 12 are illustrated as being defined by a generally semi-circular sheet of conductor, it should be understood that such a configuration is illustrative only and that various other geometric shapes such as rectangular, curved or any arbitrary configuration may be employed as long as the current loops are at least partially mutually coupled magnetically and define a continuously smaller storage inductor for example, by defining continuously smaller current loops through the load.

In FIG. 12, the numeral 1200 generally depicts a conductor in which the a current is initiated by the current source 1202 which may be switched in and out by a switch 1204. A portion 1206 of the conductor 1200 constitutes a part of the distributed load which may of course be replaced by a lumped load. In the embodiment of FIG. 12, the load comprises conductor segments 1218 and 1206 which are integrally formed with the storage inductor defined by the single current loop. The conductors 1208, 1210, 1212, 1214, 1216 and 1218 are illustrated as being two part conductors with switches 1220, 1222, 1224, 1226, 1228 and 1230 respectively interposed between the two parts of the conductors. It should be understood that the precise position of the switches within the conductors is not crucial and they can for instance be placed anywhere along the conductors. Between conductors, a relatively small space 1232 is provided to prevent contact between the conductors while ensuring good mutual coupling.

After a current is initiated in the conductor 1200 by current source 1202 with the switch 1220 closed, the source 1202 is isolated from the circuit. The current flowing through the conductor 1208 will create a magnetic field that will loop over and through conductor 1210 thereby ensuring the necessary coupling. Considering Lo to be the inductance of the large loop defined by conductor segments 1208, and considering $L_3$ to be the inductance of the load inductance defined by conductor segments 1206 and 1218, resort can be had to equation (4) to determine the instantaneous current I based on the initial source current Io provided the required coupling criteria is met. The inductance L in equation (4) corresponds to the inductance of the conductor through which the instantaneous current is flowing. Thus, it can be seen that whereas a closed current loop is formed and the size of that loop is continuously or incrementally decreased and where the current loops are mutually coupled in space, current amplification can be achieved It should be understood that in the multiturn coil embodiments of for example FIG. 4, magnetic coupling was assumed The same type of magnetic coupling exists in the single turn inductor as a result of the nature of the overlapping magnetic fields produced where the geometry and dimensions of the conductors are made to satisfy the coupling criteria.

It should be further understood that the number of conductors used to create the smaller end small current loops and the relative inductance the largest and small loops are design variables which are determined by the specific application involved and the present example is intended to be exemplary only and should not be construed as limiting the invention in any way.

As with the multiturn embodiment described above, the switching action of switches 1220, 1222, 1224, 1226, 1228 and 1230 may be done in a make-before-break manner similar to that described with regard to FIGS. 6A to 6C.

Figure 13A:
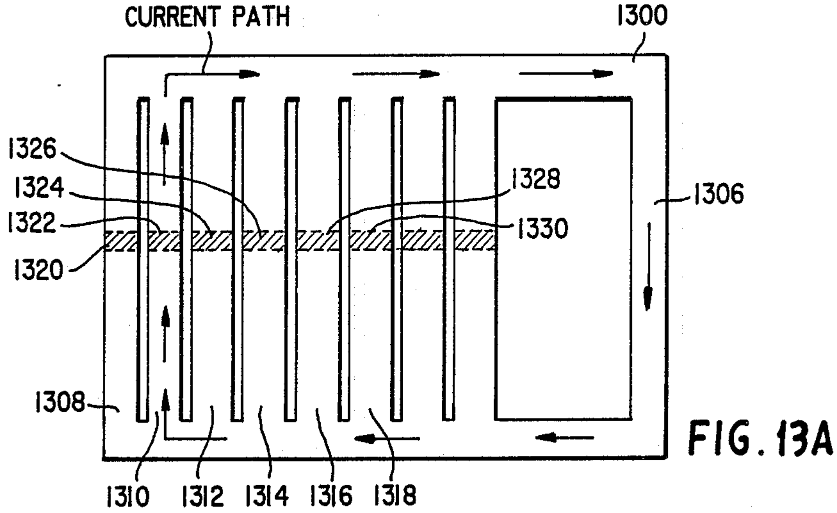
FIGS. 13A and 13B illustrate embodiments of a single turn current amplifier wherein the switches are concurrent with or coextensive to the current paths.
Figure 13B:
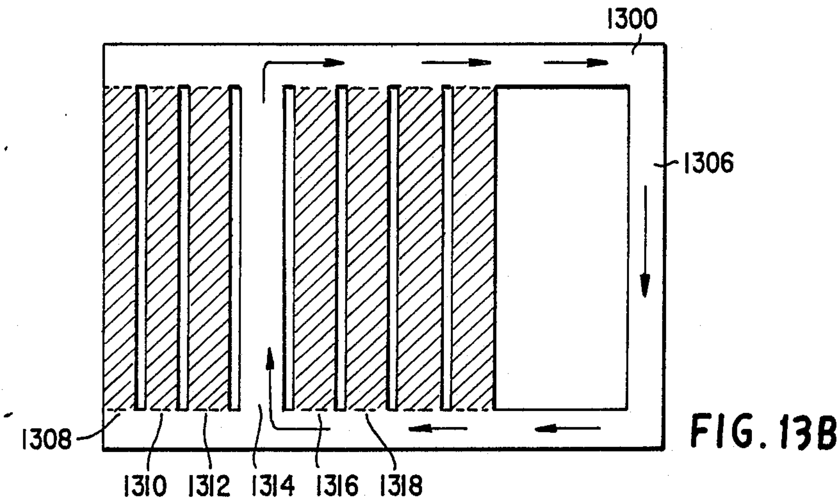

FIGS. 13A and 13B illustrate a single loop embodiment of the invention where the switches are integrally formed within the conducting paths. It should be noted that in FIGS. 13A and 13B the conducting sheet 1300 is generally rectangular as opposed to the semi-circular sheet 1200 of FIG. 12. As alluded to above, the shape of the conducting sheet is unimportant and can be any arbitrary shape in space as long as the current loops defined by the progressive switching action define a storage inductor of constantly decreasing size.

The conductors 1308, 1310, 1312, 1314, 1316, 1318, etc. are mutually coupled in the same manner as the conductors of FIG. 12. In FIG. 13A, the "switches"

1320, 1322, 1324, 1326, 1328 and 1330 etc. are integrally formed in the conductors in the form of superconductor segments, semiconductor segments or any material whose conductivity can be made to change from a high to a low value.

Where superconductor segments are used, the conductivity of the switch segments can be controlled in a known manner by the use of temperature, or pressure or magnetic fields to switch the segments between their normal and superconducting states.

Where semiconductor switch segments are used, switching may be accomplished by the use of light or bias sensitive semiconductors or the like to change the state of the switch in a known manner. It should be understood that any other type of switching scheme, such as the use positive temperature coefficient (PTC) materials can be used to accomplish switching. PCT switches can be of the externally heated or self heated type (alluded to above with respect to FIG. 7) which utilize the flowing current to heat the material and change its conductivity.

As should be apparent, the spacial position of the switch is an important factor to consider for the very fast switching regimes described above. The actual switching device utilized may be any of the well known variants familiar to artisans but should be spacially located within the material defining the current loops.

For embodiments where larger voltages will be switched, the embodiment of FIG. 13B is preferred. Where a large voltage is switched, the relatively small physical size of the switch in FIG. 13A results in a situation where the electric field is very intense across the switch. Usually, it is the electric field which is the limiting factor in terms of switching power.

In the embodiment of FIG. 13B, a large portion or all of the conductors 1308, 1310, 1312, 1314, 1316, 1318, etc. is formed of the superconductor, semiconductor, PTC or other switching material in order to distribute the electric field over a larger physical space to increase the power handling capacity of the switch. In addition, the larger switch members are easier to manufacture and control than the physically smaller devices of FIG. 13A.

It should be understood that the switching embodiments of FIG. 13A and 13B are capable of much faster current amplification than the embodiments of FIGS. 2 or 4 because of the spacial confluence of the inductor elements and the switches and because of the electronic change of state nature of the switches used in the embodiments of FIGS. 13A and 13B.

The mechanical switches of FIGS. 12 and 14 are localized in space at a point distinct from their associated inductor elements. Although current travels through a conductor at approximately the speed of light and although the physical separation between the switch and inductor element is not great, in switching regimes measured in nanoseconds, the separation becomes significant. When the inductor element and the switch occupy the same space, much higher switching speeds are achievable and problems caused by external inductances are avoided.

Figure 14A:
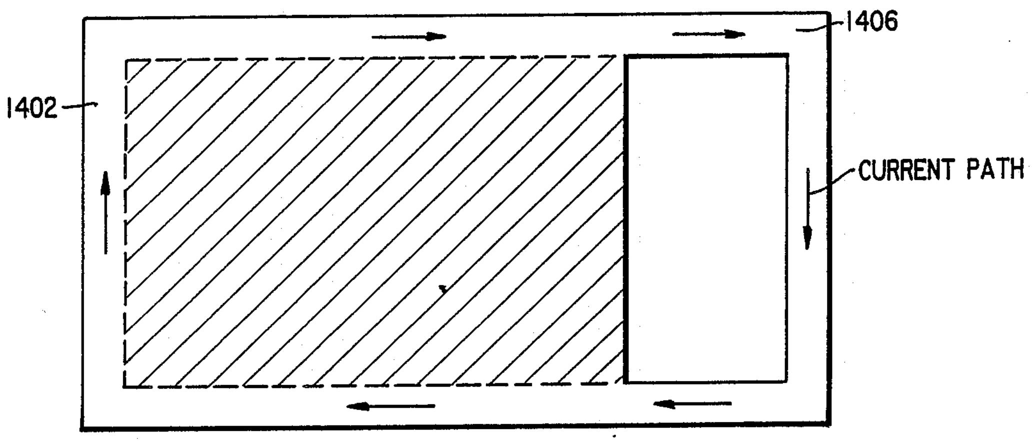
FIGS. 14A, 14B and 14C are a schematic representation of single turn embodiments where "switching" action is performed by manipulation of the conductivity of a switch section of a conductor.
Figure 14B:
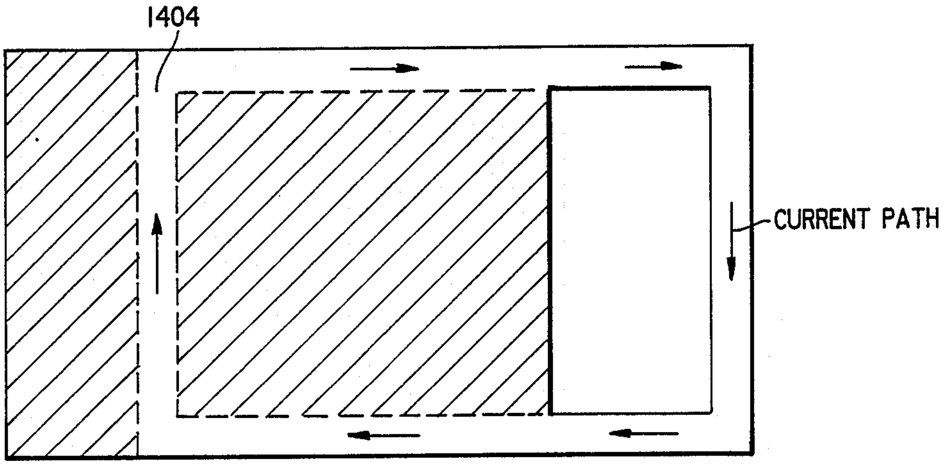
Figure 14C:
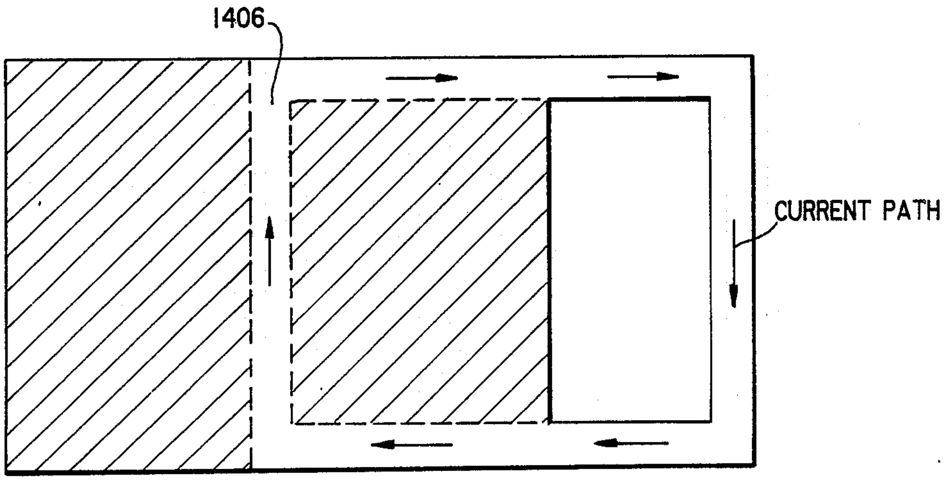

FIGS. 14A to 14C depict a current amplifier configuration where the switching action is performed by the manipulation of the conductivity of a sheet 1400. FIG. 14A illustrates the initial high conductivity current path 1402, while FIGS. 14B and 14C depict two progressive stages in the high conductivity path manipulation and the resulting decreasing size current paths 1404 and 1406 respectively, to affect the size of the storage inductance and therefore the energy transfer and current multiplication As mentioned above, depending on the application, conductivity may be manipulated by controlling semiconductive or superconductive properties of materials, or by controlling the temperature dependent resistivity of a material by the current flowing through it, by external means, or by other means, such as shock induced conductivity in dielectrics or other schemes which would suggest themselves to the artisan.

It should be noted that with sheet conductivity manipulation, the use of light sensitive pure semiconductor material in which selected regions can be made highly conductive by the use of laser light or the like is a highly advantageous embodiment.

Also advantageous is a superconducting sheet where locally applied temperature changes or magnetic fields or external pressure can be used to move the conductance path in such a manner as to continuously and progressively decrease the instantaneous inductance by decreasing the current path length and thus amplify the current.

While the conducting sheet 1400 of FIG. 14 is depicted in a rectangular geometry, it should be borne in mind that any arbitrary shape can be employed as long as the current path defined by the conductivity manipulation decreases in order to amplify current and transfer energy in accordance with equations (5) and (7) above. For example, the sheet can be curved in space so as to conform to some desired configuration or to enhance mutual coupling for a specific application. Examples of specially curved sheets are considered below with regard to FIG. 15 and FIGS. 16A-E.

The current flowing through the high conductivity inductor segment 1402 is basically a surface current which produces a magnetic field which is generally flat (in the plane of the paper) and which extends a sufficient distance to the right to enclose the space occupied by the high conductivity inductor segment 1404 before looping back on itself. Therefore the region (e.g. segment 1404) which is not yet conducting is magnetically coupled to the conducting region (e.g. segment 1402) in order to satisfy the coupling requirement for current amplification.

Figure 15:
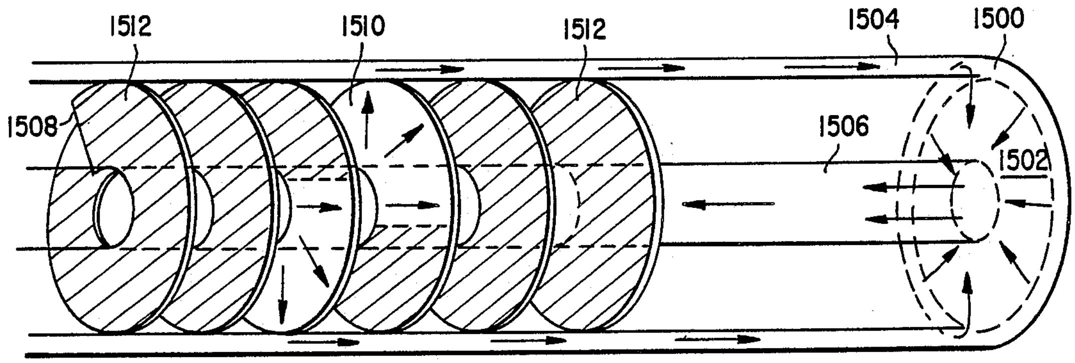
FIG. 15 illustrates a configuration defining an effective single turn conductor utilizing a switching element having a helical curvature in order to effect "switching" for a coaxial inductance.

FIG. 15 depicts a helically curved conducting sheet 1508 which functions in a manner similar to the embodiments of FIGS. 13 and 14 but which is particularly useful in order to effect switching between elements of a coaxial inductance. In FIG. 15, 1500 is a coaxial inductance with a load inductance represented by the disc shaped face 1502 of the inductance 1500. As indicated by the current arrows, current flows through the disc 1502 in the radial direction from an outer cylindrical conductor 1504 to a coaxial inner conductor 1506. It should be understood that the radial current flowing through the load inductor 1502 is from the coaxial outer conductor 1504 towards the coaxial inner conductor 1506 and produces no magnetic field of its own. The currents flowing through the inner and outer conductors 1504 and 1506 flow in an opposite sense from each other.

In this embodiment, "switching" is accomplished by advancing a high conductivity portion 1510 of the helix to the right either continuously or in small, discrete intervals. Where the pitch of the helix is small, the conducting portion 1510 approximates a disc which is moving to the right. In this embodiment, the magnetic coupling between inductor segments is particularly good since even when the high conductivity section of the helix moves through the helix at a high rate of speed, it advances only slowly with respect to the inductor elements. In other words, the high conductivity section of 1510 must advance 360° around the helix to advance one pitch in the axial direction. This ensures excellent mutual coupling. The low conductivity sections of the helix are noted in FIG. 15 as the shaded areas 1512.

Figure 16A:
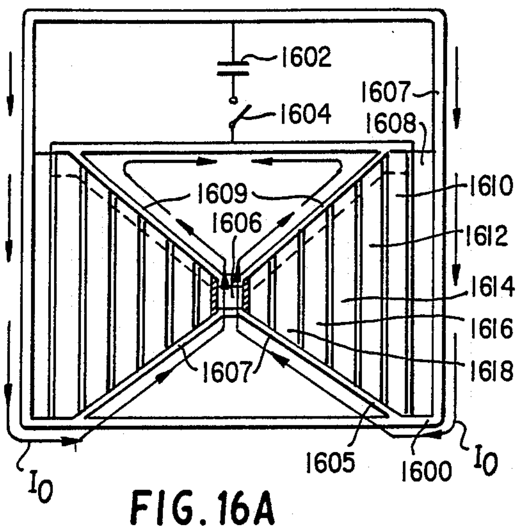
FIGS. 16A, 16B, 16C and 16D are a plan, sectional view of a circular hourglass embodiment of the invention and mode of operation.
Figure 16B:
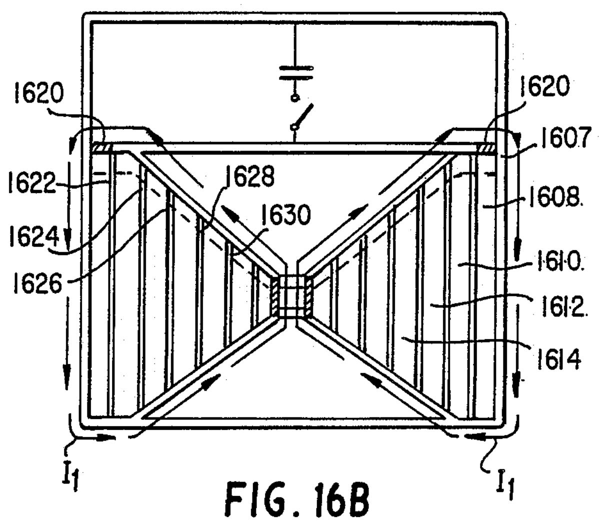
Figure 16C:
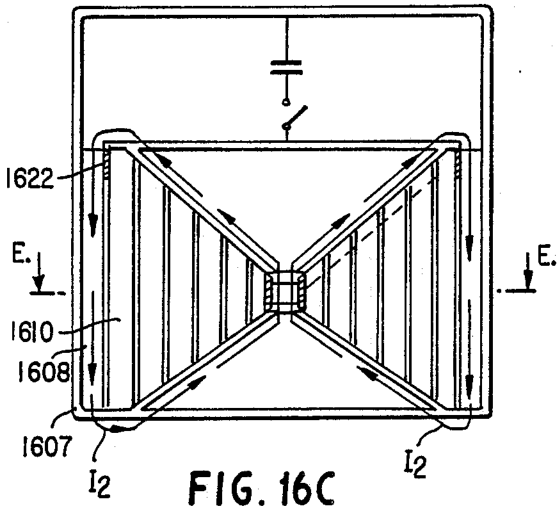
Figure 16D:
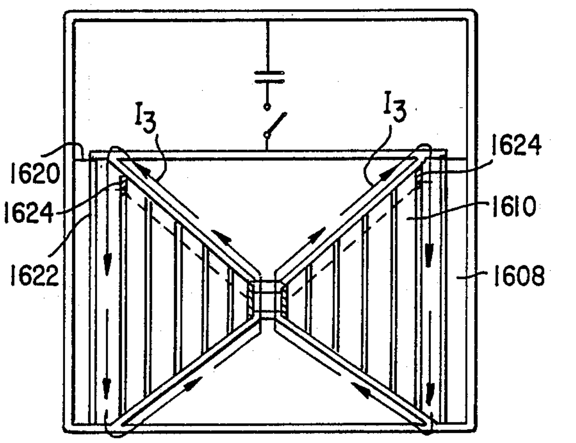
Figure 16E:
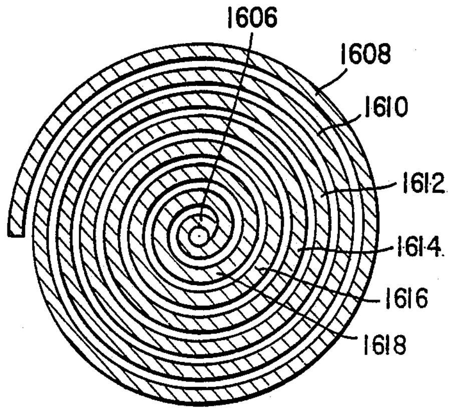
FIG. 16E is a sectional view, through Section E—E of FIG. 16C.

Turning now to FIG. 16A there is illustrated an "hourglass" embodiment of the invention. In this case, the conducting sheet comprises for example a flat triangular sheet of material, rolled into a helical spiral 1605 the load 1606 positioned at the apex of the triangular sheet. Once rolled, the helical spiral 1605 when viewed in plan cross-section will resemble a horizontal "hourglass" shape with the load 1606 at the center of the hourglass. An initial current I is established in the current amplifier 1600 by for example discharging a charged capacitor 1602 through a switch 1604. The initial current I flows through the peripheral current path 1607 and the load 1606 before looping back on itself to close the circuit.

In this embodiment, a switching scheme similar to that depicted in FIGS. 13A or 13B can be employed. After the switch 1604 is opened the current Io is diverted into a large current loop by a switching scheme further described below.

Generally cylindrically-shaped conductor segments 1607, 1608, 1610, 1612, etc. formed by material rolled into the helical spiral 1605 are mutually coupled in a manner similar to the conductors of FIGS. 13A or 13B or the segments of the helix of FIG. 15. Switches 1620, 1622, 1624, 1626, etc. are integrally formed with the generally cylindrical conductor segments, the switches being in the form of super-conducting segments, semiconductor segments or any material whose conductivity can be rapidly and dramatically made to change from low to high. Such switches are further described above with regard to FIGS. 13A and 13B The switches 1620, 1622, 1624, 1626, etc. are used to direct the current through progressively smaller and smaller current loops, I1, I2, I3, etc. Since the size of the generally cylindrical conductor segments 1607, 1608, 1610, etc. of the helical spiral 1605 is large relative to the space between conductor segments, excellent mutual coupling between conductor segments is achieved and current is transferred progressively toward the load 1606. The helical spiral is disposed between conductors 1607 and 1609 which form a part of the current path through the load 1606.

In this embodiment, as the current loop is progressively switched toward the load, the current advances through the cylindrical conductor 1607, and the generally cylindrical conductor segments 1608, 1610, 1612, etc., toward the center load 1606. The conductor segments 1608, 1610, 1612, etc. are closely spaced and therefore mutually coupled to the adjacent conductor segments and excellent energy transfer can be achieved.

In the single loop embodiments of FIGS. 12–16, only a single current loop has been indicated for each load. It should be understood by the artisan that a load can be connected to more than one current loop within the spirit and scope of the present invention.

The foregoing description of several preferred embodiments of the invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An energy transfer, current amplifying device comprising:

- a single turn energy storage inductor comprising a plurality of at least partially mutually coupled inductor elements for storing magnetic energy;
- an energy source switchably connected to said single turn inductor for supplying an energizing current thereto;
- a load inductor integrally formed with said single turn inductor and operable to receive a current flowing in said single turn inductor;
- means operable to effectively connect said single turn inductor to said load inductor to form a first current carrying circuit between said single turn inductor and load inductor and to thereafter progressively disconnect at least some of said inductor elements of said single turn inductor from said circuit, thereby defining a continuously smaller single turn energy storage inductor in said current carrying circuit and increasing the magnitude of the current in said circuit.

2. The current amplifier of claim 1, wherein said means comprises a switching means for progressively connecting a means defining a first inductor element of said single turn inductor into said circuit, then connecting a means defining a second inductor element of said single turn inductor, at least partially mutually coupled to said first inductor element of said single turn inductor, to said first inductor element concurrently with connecting both said means defining first and second inductor elements of said single turn inductor into said circuit followed by disconnecting said means defining first inductor element of said single turn inductor from said circuit while leaving said means defining second inductor element of said single turn inductor coil connected into said circuit.

3. The current amplifier of claim 1, wherein said means comprises a switching means for connecting a means defining plurality of said inductor elements of said single turn inductor into said circuit and then progressively disconnecting said connected inductor elements from said circuit.

4. The energy transfer current amplifying device of claim 2 or 3, wherein said switching means is a mechanical switching means.

5. The energy transfer current amplifying device of claim 2 or 3, wherein said switching means is an electromechanical switching means.

6. The energy transfer current amplifying device of claim 2 or 3, wherein said switching means is a semiconductor switching means.

7. The energy transfer current amplifying device of claim 2 or 3, wherein said single turn inductor is a superconductor and said switching means is a superconducting switching arrangement formed in said single turn inductor.

8. The energy transfer current amplifying device of claim 2 or 3, wherein said single turn inductor is non-superconducting and said switching means is a superconducting switch means.

9. The energy transfer, current amplifying device of claim 2 or 3, wherein said single turn inductor is superconducting and said switching means is a non-superconducting switch means.

10. The energy transfer, current amplifying device of claim 2 or 3, wherein said switching means is operable to progressively transfer energy from the load inductor to the single turn inductor.

11. The energy transfer, current amplifying device of claim 2 or 3, wherein said single turn inductor comprises a plurality of closely spaced, at least partially mutually coupled current path segments formed in said single turn inductor wherein each adjacent current path segment defines a current loop through said load inductor of progressively decreasing length.

12. The energy transfer, current amplifying device of claim 11, wherein said switching means comprises a plurality of switching elements respectively positioned within said plurality of current path segments.

13. The energy transfer, current amplifying device of claim 12, wherein said switching elements are at least partially coextensive with said current path segments.

14. The energy transfer, current amplifying device of claim 13, wherein said switching elements are physically coextensive with said current path segments.

15. The energy transfer, current amplifying device of claim 2 or 3, wherein said single turn inductor comprises a conducting sheet having mutually coupled conducting paths defined therein by said switching means, said conducting paths defining current loops through said single turn inductor and load inductor of progressively smaller length.

16. The energy transfer, current amplifying device of claim 15, wherein said conducting sheet comprises a superconducting sheet and said switching means comprises means for selectively changing the conductivity of portions of said superconducting sheet.

17. The energy transfer, current amplifying device of claim 15, wherein said conducting sheet comprises a semiconductor sheet and said switching means comprises means for selectively changing the conductivity of portions of said semiconductor sheet.

18. The energy transfer, current amplifying device of claim 15, wherein said conducting sheet is formed of a positive temperature coefficient (PTC) material and said switching means comprises means for selectively changing the conductivity of portions of said PCT material.

19. The energy transfer, current amplifying device of claim 2, wherein said single turn inductor comprises an elongated central conductor and a coaxial outer conductor defining therebetween an annular space and said load inductor comprises a space adjacent to a disk disposed in said annular space and wherein said switching means comprises a helical winding extending between said central conductor and outer conductor and having a plurality of turns operable to be selectively and progressively rendered electrically conducting, said helix being operable to form a closed current loop with said central and coaxial conductors and said disk, said closed current loop having a progressively decreasing length in accordance with the position of the conductive turn of said helical winding.

20. The energy transfer, current amplifying device of claim 19, wherein said helical winding carries a surface current in a radial direction between said central conductor and said outer conductor, wherein the conductive turn of the helical winding progresses through said winding in a direction transverse to said radial direction.

21. The energy transfer, current amplifying device of claim 2, wherein said single turn inductor includes a cylindrical helical winding comprising a plurality of generally coaxial, mutually coupled, continuously connected, generally cylindrically-shaped segments which respectively define a plurality of current paths of progressively decreasing length, said cylindrical helix being disposed between a pair of conductors and wherein said switching means comprises a plurality of switching elements, each associated with one of said plurality of generally cylindrically-shaped segments and said pair of conductors.

22. The energy transfer, current amplifying device of claim 21, wherein said generally cylindrically-shaped segments are of progressively decreasing size and said pair of conductors converge to follow progressively decreasing sized generally cylindrically-shaped segments.

23. The energy transfer, current amplifying device of claim 1, wherein said single turn inductor is in the form of at least a portion of a curve (1200) having a series of generally parallel, closely spaced cords, said cords defining paths of progressively decreasing length which include at least a portion of said curve and said load inductor, said switching means being physically coincident in space with said cords.

24. The energy transfer, current amplifying device of claim 23 wherein said load inductor is a distributed load inductor integrally formed with said single turn inductor.

25. The energy transfer, current amplifying device of claim 1, further comprising a second, single turn inductor having a plurality of mutually coupled inductor elements connected to said load inductor forming a second current loop through said load inductor.

26. An energy transfer, current amplifying device comprising:

a single turn energy storage inductor comprising a plurality of at least partially mutually coupled inductor elements for storing magnetic energy;

an energy source switchably connected to said single turn inductor for supplying an energizing current thereto;

a load inductor connected to said single turn inductor and operable to receive a current flowing in said single turn inductor;

means operable to effectively connect said single turn inductor to said load inductor to form a first current carrying circuit between said single turn inductor and load inductor and to thereafter progressively disconnect at least some of said inductor elements of said single turn inductor from said circuit, thereby increasing the magnitude of the current in said circuit and wherein a second single turn inductor comprising a plurality of at least partially mutually coupled inductor elements is connected to said load inductor.

27. An energy transfer, current amplifying device comprising:

a single turn energy storage inductor comprising a plurality of at least partially mutually coupled inductor elements for storing magnetic energy;

an energy source switchably connected to said single turn indicator for supplying an energizing current thereto;

a load inductor in the form of a lumped load inductance separate from said single turn inductor connected to said single turn indicator and operable to receive a current flowing in said single turn inductor;

means operable to effectively connect said single turn inductor to said load inductor to form a first current carrying circuit between said single turn inductor and load inductor and to thereafter progressively disconnect at least some of said inductor elements of said single turn inductor from said circuit, thereby defining a continuously smaller single turn energy storage inductor in said current carrying circuit and increasing the magnitude of the current in said circuit.

28. The current amplifier of claim 27 wherein said means comprises a switching means for progressively connecting a means defining a first inductor element of said single turn inductor into said circuit, then connecting a means defining a second inductor element of said single turn inductor, at least partially mutually coupled to said first inductor element of said single turn inductor, to said first inductor element concurrently with connecting both said means defining first and second inductor elements of said single turn inductor into said circuit followed by disconnecting said means defining first inductor element of said single turn inductor from said circuit while leaving said means defining second inductor element of said single turn inductor coil connected into said circuit.

29. The energy transfer current amplifying device of claim 27 or 28, wherein said switching means is a mechanical switching means.

30. The energy transfer current amplifying device of claim 27 or 28, wherein said switching means is an electromechanical switching means.

31. The energy transfer current amplifying device of claim 27 or 28, wherein said switching means is a semiconductor switching means.

32. The energy transfer current amplifying device of claim 27 or 28, wherein said single turn inductor is a superconductor and said switching means is a superconducting switching arrangement formed in said single turn inductor.

33. The energy transfer current amplifying device of claim 27 or 28, wherein said single turn inductor is non-superconducting and said switching means is a superconducting switch means.

34. The energy transfer, current amplifying device of claim 27 or 28, wherein said single turn inductor is superconducting and said switching means is a non-superconducting switch means.

35. The energy transfer, current amplifying device of claim 27 or 28, wherein said switching means is further operable to progressively transfer energy from the load inductor to the single turn inductor.

36. The energy transfer, current amplifying device of claim 27 or 28, wherein said single turn inductor comprises a plurality of closely spaced, at least partially mutually coupled current path segments formed in said single turn inductor wherein each adjacent current path segment defines a current loop through said load inductor of progressively decreasing length.

37. The energy transfer, current amplifying device of claim 36, wherein said switching means comprises a plurality of switching elements respectively positioned within said plurality of current path segments.

38. The energy transfer, current amplifying device of claim 37, wherein said switching elements are at least partially coextensive with said current path segments.

39. The energy transfer, current amplifying device of claim 38, wherein said switching elements are physically coextensive with said current path segments.

40. The energy transfer, current amplifying device of claim 27 or 28, wherein said single turn inductor comprises a conducting sheet having mutually coupled conducting paths defined therein by said switching means, said conducting paths defining current loops through said single turn inductor and load inductor of progressively smaller length.

41. The energy transfer, current amplifying device of claim 40, wherein said conducting sheet comprises a superconducting sheet and said switching means comprises means for selectively changing the conductivity of portions of said superconducting sheet.

42. The energy transfer, a current amplifying device of claim 40, wherein said conducting sheet comprises a semiconductor sheet and said switching means comprises means for selectively changing the conductivity of portions of said semiconductor sheet.

43. The energy transfer, current amplifying device of claim 40, wherein said conducting sheet is formed of a positive temperature coefficient (PTC) material and said switching means comprises means for selectively changing the conductivity of portions of the PTC material.

44. The current amplifier of claim 27, wherein said means comprises a switching means for connecting a means defining plurality of said inductor elements of said single turn inductor into said circuit and then progressively disconnecting said connected inductor elements from said circuit.

45. The energy transfer, current amplifying device of claim 27, wherein said single turn inductor comprises an elongated central conductor and a coaxial outer conductor defining therebetween an annular space and said load inductor comprises a space adjacent to a disk dispose in said annular space and wherein said switching means comprises a helical winding extending between said central conductor and outer conductor and having a plurality of turns operable to be selectively and progressively rendered electrically conducting, said helix being operable to form a closed current loop with said central and coaxial conductors and said disk, said closed current loop having a progressively decreasing length in accordance with the position of the conductive turn of said helical winding.

46. The energy transfer, current amplifying device of claim 45, wherein said helical winding carries a surface current in a radial direction between said central conductor and said outer conductor, wherein the conductive turn of the helical winding progresses through said winding in a direction transverse to said radial direction.

47. The energy transfer, current amplifying device of claim 27, wherein said single turn inductor includes a cylindrical helical winding comprising a plurality of generally coaxial, mutually coupled, continuously connected, generally cylindrically-shaped segments which respectively define a plurality of current paths of progressively decreasing length, said cylindrical helix being disposed between a pair of conductors and wherein said switching means comprises a plurality of switching elements, each associated with one of said plurality of generally cylindrically-shaped segments and said pair of conductors.

48. The energy transfer, current amplifying device of claim 47, wherein said generally cylindrically-shaped segments are of progressively decreasing size and said pair of conductors converge to follow progressively decreasing sized generally cylindrically-shaped segments.

49. The energy transfer, current amplifying device of claim 47, further comprising a second, single turn inductor having a plurality of mutually coupled inductor elements connected to said load inductor forming a second current loop through said load inductor.

* * * * *